United States Patent
Taniguchi et al.

[11] Patent Number: 5,845,732
[45] Date of Patent: Dec. 8, 1998

[54] DRIVETRAIN FOR AN ELECTRIC VEHICLE

[75] Inventors: Takuji Taniguchi, Okazaki; Masahiro Hasebe, Anjo; Masayuki Takenaka, Nishio, all of Japan

[73] Assignee: Aisin Aw Co., Ltd., Japan

[21] Appl. No.: 632,323

[22] Filed: Apr. 17, 1996

[30]       Foreign Application Priority Data

Apr. 19, 1995  [JP]  Japan .................................... 7-116607

[51] Int. Cl.⁶ ................................................ B60K 17/12
[52] U.S. Cl. ............................................................ 180/65.6
[58] Field of Search .............................. 180/65.6, 65.7, 180/247, 248, 165, 292, 65.4, 65.3

[56]             References Cited

U.S. PATENT DOCUMENTS

| | | | |
|---|---|---|---|
| 4,280,583 | 7/1981 | Stieg ........................................ | 180/250 |
| 5,078,660 | 1/1992 | Williams et al. ........................ | 475/84 |
| 5,380,255 | 1/1995 | Brissenden et al. .................... | 475/204 |
| 5,490,063 | 2/1996 | Genise ................................... | 364/424.1 |
| 5,651,749 | 7/1997 | Wilson et al. .......................... | 475/221 |
| 5,655,986 | 8/1997 | Wilson et al. .......................... | 475/204 |

FOREIGN PATENT DOCUMENTS 5116540  5/1993  Japan .
692152   4/1994  Japan .

OTHER PUBLICATIONS

The Development of the Elostar Powertrain, Sims et al., Symposium Proceedings, Second vol., Sess. 10–20, 27–30 Sep. 1992.

*Primary Examiner*—Brian L. Johnson
*Assistant Examiner*—Bridget Avery
*Attorney, Agent, or Firm*—Lorusso & Loud

[57]             ABSTRACT

A drivetrain for an electric vehicle includes a motor, a pair of drive shafts, and a compact and simple transmission mechanism composed of two planetary gear units to achieve a differential function as well as a large reduction speed ratio. The transmission mechanism has an input element coupled to the motor, one output element coupled to one of the drive shafts, coupling elements coupling the units together, a fixed element, and another output element coupled to the other of the drive shafts. The torque received at the input element is increased and transmitted to one output element, and the torque is also reversed between the one output element and one of the coupling elements. After transmission through the coupling elements the torque is again reversed and then transmitted to the other output element.

3 Claims, 9 Drawing Sheets

FIG. 3

| | GEAR-TRAIN | rotational speed | Torque | Torque share(50:50) equalizing condition | Speed reductional ratio |
|---|---|---|---|---|---|
| (a) | | | | $\lambda_2 = \dfrac{1}{\lambda_1 + 2}$ | $1 + \dfrac{1}{\lambda_1 \lambda_2}$ |
| (b) | | | | $\lambda_2 = \dfrac{\lambda_1 + 1}{\lambda_1 + 2}$ | $1 + \dfrac{1}{\lambda_1(1-\lambda_2)}$ |
| (c) | | | | $\lambda_2 = \dfrac{\lambda_1 + 1}{\lambda_1 + 2}$ | $-\left(\dfrac{1+\lambda_1}{\lambda_1 \lambda_2} - 1\right)$ |
| (d) | | | | $\lambda_2 = \dfrac{1}{\lambda_1 + 2}$ | $-\left(\dfrac{\lambda_1 \lambda_2 + 1}{\lambda_1(1-\lambda_2)}\right)$ |

FIG. 4

| | GEAR-TRAIN | rotational speed | Torque | Torque share(50:50) equalizing condition | Speed reductional ratio |
|---|---|---|---|---|---|
| (e) | | | | $\lambda_2 = 1-\lambda_1$ | $-\left(\dfrac{1+\lambda_2}{\lambda_1}-1\right)$ |
| (f) | | | | $\lambda_2 = 1-\lambda_1$ | $\dfrac{1}{\lambda_1}+\dfrac{1}{\lambda_1\lambda_2}-\dfrac{1}{\lambda_2}$ |
| (g) | | | | $\lambda_2 = \lambda_1$ | $-\left(\dfrac{\lambda_2+\lambda_1}{1-\lambda_1}\right)$ |
| (h) | | | | $\lambda_2 = \lambda_1$ | $\dfrac{\lambda_2+\lambda_1}{\lambda_2(1-\lambda_1)}$ |

FIG. 5

| | GEAR-TRAIN | rotational speed | Torque | Torque share(50:50) equalizing condition | Speed reductional ratio |
|---|---|---|---|---|---|
| (i) | | | | $\lambda_2 = \dfrac{1}{2-\lambda_1}$ | $-\left(\dfrac{1}{\lambda_1\lambda_2}-1\right)$ |
| (j) | | | | $\lambda_2 = \dfrac{1-\lambda_1}{2-\lambda_1}$ | $-\left(\dfrac{1}{\lambda_1(1-\lambda_2)}-1\right)$ |
| (k) | | | | $\lambda_2 = \dfrac{1-\lambda_1}{2-\lambda_1}$ | $1+\dfrac{1-\lambda_1}{\lambda_1\lambda_2}$ |
| (l) | | | | $\lambda_2 = \dfrac{1}{2-\lambda_1}$ | $\dfrac{1-\lambda_1\lambda_2}{\lambda_1(1-\lambda_2)}$ |

FIG. 6

| | GEAR-TRAIN | rotational speed | Torque | Torque share(50:50) equalizing condition | Speed reductional ratio |
|---|---|---|---|---|---|
| (m) | | | | $\lambda_2 = \dfrac{1}{\lambda_1+1}$ | $-\left(\dfrac{1}{\lambda_2(1-\lambda_1)}-1\right)$ |
| (n) | | | | $\lambda_2 = \dfrac{\lambda_1}{\lambda_1+1}$ | $-\left(\dfrac{1}{(1-\lambda_1)(1-\lambda_1)}-1\right)$ |
| (o) | | | | $\lambda_2 = \dfrac{\lambda_1}{\lambda_1+1}$ | $1+\dfrac{\lambda_1}{\lambda_2(1-\lambda_1)}$ |
| (p) | | | | $\lambda_2 = \dfrac{1}{\lambda_1+1}$ | $1+\dfrac{\lambda_1}{(1-\lambda_1)(1-\lambda_2)}$ |

FIG.7

| GEAR-TRAIN | rotational speed | Torque | Torque share(50:50) equalizing condition | Speed reductional ratio |
|---|---|---|---|---|
| (q) | | | $\lambda_2 = \dfrac{1}{\lambda_1 + 1}$ | $1 + \dfrac{1}{\lambda_1} + \dfrac{1}{\lambda_1 \lambda_2}$ |
| (r) | | | $\lambda_2 = \dfrac{1}{\lambda_1 + 1}$ | $-\left(\lambda_2 + \dfrac{1 + \lambda_2}{\lambda_1}\right)$ |

DRIVETRAIN FOR AN ELECTRIC VEHICLE

BACKGROUND OF THE INVENTION

1. Field of the Invention

This invention relates to a drivetrain for an electric vehicle and, more particularly, to a drivetrain including a transmission mechanism having a speed reduction function, reducing the rotational speed of the motor, and a deferential function, transmitting the reduced rotational speed at different rotational speeds to left and right drive wheels.

2. Description of Related Prior Art

In a drivetrain for an electric vehicle, if a single motor is used to produce the drive torque necessary to drive the pair of drive wheels, the motor must be large and mountability on the vehicle becomes a problem. A drivetrain has been proposed in which speed reduction gearing is provided between the motor and the drive wheels to reduce the motor's rotational speed and increase the torque. Such a drivetrain is disclosed, for example, in Japanese Patent Unexamined Publication No. 5-116,540 (hereinafter referred as to Publication No. 1). As shown in FIG. 8 of this publication, a transmission mechanism 3' increases the drive torque of a motor M in speed reduction gearing RG in the form of a planetary gear set shared with a bevel gear type differential unit DG which distributes the increased torque to left and right drive shafts $S_L$, $S_R$ and then to left and right drive wheels $H_L$, $H_R$.

Drivetrains in which the speed reduction gearing is formed of two planetary gear units, to obtain a larger speed reduction ratio than that of the conventional drivetrain, are disclosed in Japanese Patent Unexamined Publication No. 6-92,152 (hereinafter referred as to Publication No. 2) and were announced publicly at The 11th International Electric Automobile Symposium held in Florence, Italy, Sep. 27 through 30, 1992 ("The Development of the Ecostar Powertrain", 2–12.08, 12. *Drivetrain Technology*) (hereinafter referred to as Publication No. 3). As shown in FIG. 9 of these publications, a transmission mechanism 3" increases the drive torque of the motor M in a speed reduction gearing RG formed of two pinion gear type planetary gear units, shared with a pinion gear type differential unit DG which distributes the increased torque to left and right drive shafts $S_L$, $S_R$ and then to left and right drive wheels $H_L$, $H_R$.

It is desirable to increase the speed reduction ratio gained by the speed reduction gearing in order to make the motor more compact and lightweight. To gain a large speed reduction ratio in a drivetrain with a single planetary gear unit serving as the speed reduction gearing RG, e.g. as in Publication No. 1, either the inner diameter of the ring gear R of the planetary gear unit must be enlarged, or the outer diameter of the sun gear S must be reduced. However, reduction of the outer diameter of the sun gear S is limited by the structural strength required for the shaft passing therethrough where, as in Publication No. No. 1, the motor M is mounted coaxially with the transmission mechanism 3' and where one of the drive shafts $S_1$, $S_R$ for connecting the differential unit DG with the drive wheels $H_L$, $H_R$ passes inside the sun gear S. Enlargement of the inner diameter of the ring gear R is also limited by need to provide the lowest possible body height for the vehicle.

While the transmission mechanism 3" of Publication Nos. 2 and 3 provides a large speed reduction ratio because the speed reduction gearing is composed of two planetary gear units, it is undesirably complicated and large in size because it has a total of three planetary gear units arranged coaxially with the motor, not withstanding use of a pinion gear type planetary gear unit as the differential unit DG.

SUMMARY OF THE INVENTION

It is an object of the invention to provide a drivetrain for an electric vehicle including a transmission mechanism providing both a differential function and a large speed reduction ratio, in a simple and compact design combining two planetary gear units.

The foregoing object is accomplished with a drivetrain for an electric vehicle which includes a motor, a pair of drive shafts, coupled to left and right drive wheels of the vehicle, respectively, one of which passes through the motor, and a transmission mechanism arranged coaxially with the pair of drive shafts for reducing the rotational speed of the motor and transmitting the reduced rotational speed to the pair of the drive shafts. The transmission mechanism includes a first planetary gear unit having a first gear element coupled to the motor, a second gear element coupled to one of the drive shafts, and a third gear element. Torque is increased in transmission to the first gear element and the increased torque is transmitted to the second gear element and torque is transmitted in the reverse direction between the second and third gear elements. The transmission mechanism further includes a second planetary gear unit having a fourth gear element coupled to the third gear element of the first planetary gear unit, a fixed fifth gear element, and a sixth gear element coupled to the other of the drive shafts. Torque is transmitted to the sixth gear element in the reverse direction from the fourth gear element.

In one embodiment of the invention, the transmission mechanism has a first planetary gear unit in which the absolute value of the torque transmitted to the third gear element is larger than the absolute value of the torque transmitted to the second gear element and the second planetary gear unit functions as a speed increasing unit. Alternatively, the transmission mechanism may have a first planetary gear unit in which the absolute value of the torque transmitted to the third gear element is smaller than the absolute value of the torque transmitted to the second gear element and a second planetary gear unit which functions as a speed reduction unit.

The transmission mechanism in the drivetrain according to the invention provides a larger speed reduction ratio, without enlargement of the inner diameter of the ring gear, by the combination of the first and second planetary gear units, as compared to the speed reduction by the single planetary gear unit described in Publication No. 1. The increased speed reduction ratio afforded by the transmission mechanism of the present invention allows the motor to be made compact and lightweight. Since the transmission mechanism itself has a differential function because of the manner in which the two planetary gear units are coupled, the drivetrain can be made more compact as compared to a drivetrain having a separate differential unit and two planetary gear units combined to provide speed reduction as described in Publication Nos. 2 and 3. Therefore, according to the invention, the entire drivetrain of the electric vehicle can be made small in size not only because the motor can be made small and lightweight due to the increased speed reduction ratio, but also because the transmission mechanism itself can be made small and lightweight.

BRIEF DESCRIPTION OF THE DRAWINGS

The above and other objects and features of the invention will become apparent to those skilled in the art from the following description of preferred embodiments when considered in conjunction with the accompanied drawings, in which:

FIGS. 3 and 4 are tables of structures and respective characteristics of various transmission mechanisms combining a single planetary gear set and a double planetary gear set;

FIGS. 5 and 6 are tables of structures and respective characteristics of transmission mechanisms combining a pair of double planetary gear sets;

FIG. 7 is a table showing structure and characteristics of a transmission mechanism combining a pair of single planetary gear sets;

DETAILED DESCRIPTION OF THE PREFERRED EMBODIMENTS

Figure 1:
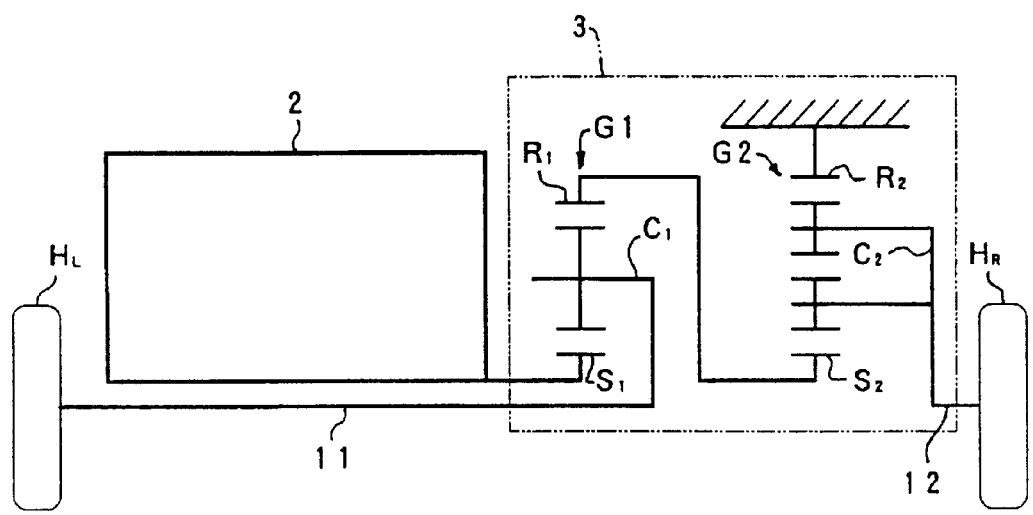
FIG. 1 is a skeletal diagram of a drivetrain for an electric vehicle according to a first embodiment of the invention.

A first preferred embodiment of the invention is shown in FIG. 1 as a combination of a first planetary gear unit in which each of the pinion gears meshes with a sun gear and a ring gear (hereinafter referred to as a single pinion gear set) and a second planetary gear unit in which one of a pair of pinion gears meshes with a sun gear and the other pinion gear meshes with a ring gear and the two pinion gears mesh with each other (hereinafter referred to as a double pinion gear set).

The drivetrain for an electric vehicle shown in FIG. 1 includes a motor 2, a pair of drive shafts 11, 12, one of which passes through the body of the motor 2, connected to a pair of vehicles drive wheels $H_L$, $H_R$, respectively, and a transmission mechanism 3 arranged coaxially with the pair of the drive shafts 11, 12 for reducing the rotational speed of the motor 2 and transmitting the reduced speed to the pair of the drive shafts 11, 12. The transmission device 3 includes a first planetary gear unit G1 and a second planetary gear unit G2. The first planetary gear unit G1 has a first gear element connected to the motor 2, a second gear element connected to the drive shaft 11, and a third gear element. In this embodiment, the first gear element is a sun gear $S_1$; the second gear element is a carrier $C_1$; and the third gear element is a ring gear $R_1$. The first planetary gear unit G1 increases the torque transmitted to the sun gear $S_1$, transmits the increased torque to the carrier $C_1$, and transmits torque in the reverse direction between the carrier $C_1$ and the ring gear $R_1$. The second planetary gear unit G2 has a fourth gear element coupled to the ring gear $R_1$ of the first planetary gear unit G1, a fixed fifth gear element, and a sixth gear element coupled to the other drive shaft 12. In this embodiment, the fourth gear element is a sun gear $S_2$; the fifth gear element is a ring gear R2; and the sixth gear element is a carrier $C_2$. The second planetary gear unit G2 transmits the torque from the sun gear $S_2$ to the carrier $C_2$ with reversal of the direction of the torque.

The first planetary gear unit G1 in the transmission mechanism 3 is designed so that the absolute value of the torque transmitted to the third gear element, or the ring gear $R_1$, is smaller than the absolute value of the torque transmitted to the second gear element, or the carrier $C_1$, and the second planetary gear unit G2 is designed to function as a speed reduction mechanism.

Figure 2:
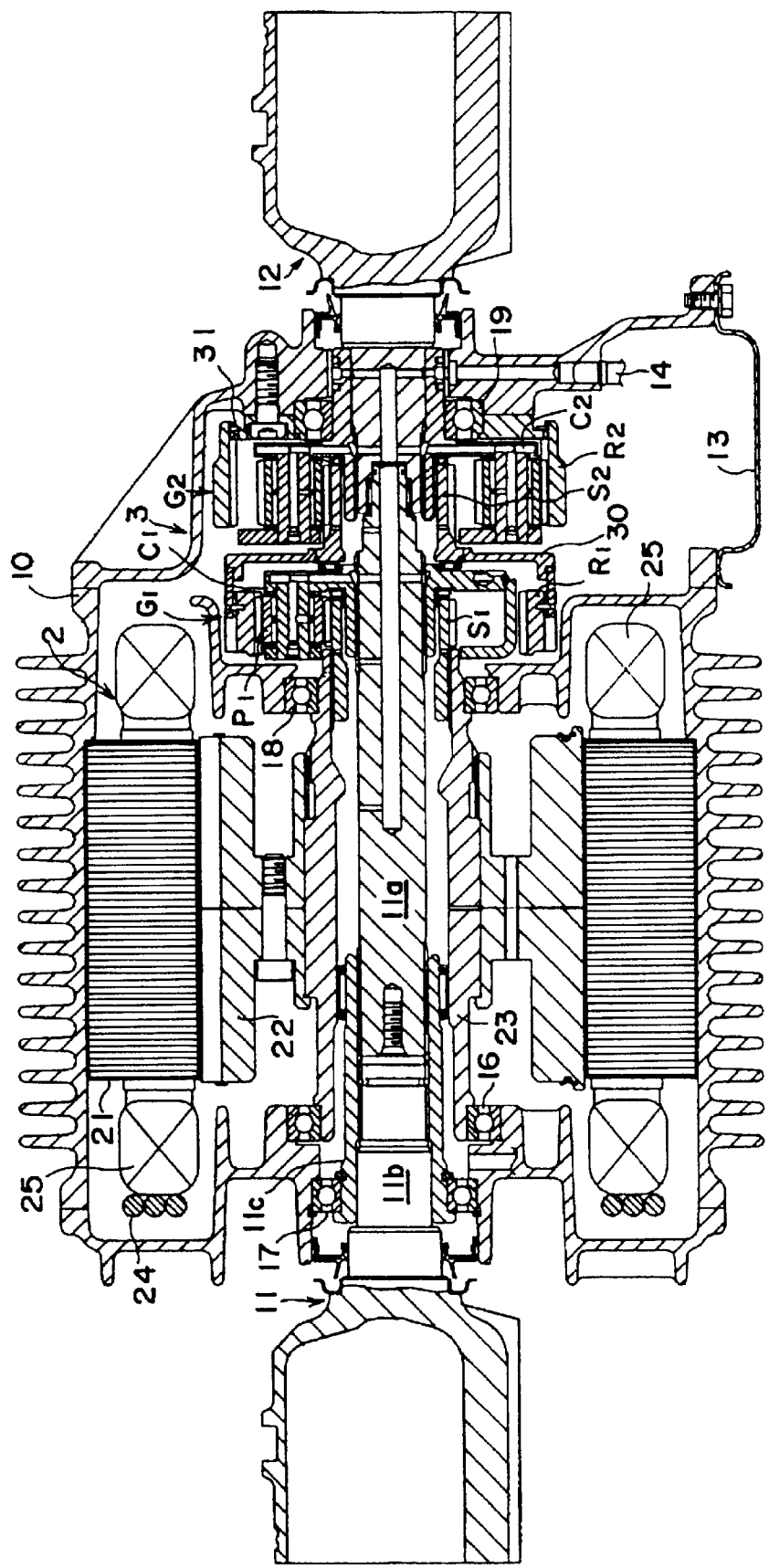
FIG. 2 is an axial cross-section of the drivetrain of the first embodiment.

FIG. 2 shows an axial cross-section of the electric vehicle drivetrain of the embodiment shown in FIG. 1 and described above. The motor 2 includes a stator 21 secured to a casing 10, a rotor 22 disposed radially inside the stator 21, and a hollow rotor shaft 23 splined to the rotor 22 and rotatably supported by the casing 10 through a pair of bearings 16, 18 to receive forces in the radial and thrust directions. The drive shaft 11 passing through the body of the motor 2 is divided into a gear shaft 11a and a yoke shaft 11b, which are coupled by splining to a connection sleeve 11c so as to rotate together. The drive shaft 11 is supported in radial and thrust directions by the casing 10 at the yoke shaft 11b end through a radial ball bearing 17 and is supported radially at the gear shaft 11a end by insertion of the distal end of the gear shaft 11a into a shaft hole formed in the other drive shaft 12. The other drive shaft 12 is supported by the casing 10 through a radial ball bearing 19 and by the carrier $C_2$ of the second planetary gear unit G2 in radial and thrust directions.

The transmission mechanism 3, as described above, has first and second planetary gear units G1, G2. In this embodiment, the first planetary gear unit G1 is a single pinion gear set and the second planetary gear unit G2 is a double pinion gear set. The sun gear $S_1$ of the first planetary gear unit G1 is splined to the radially inner circumference of the hollow rotor shaft 23; the carrier $C_1$ supporting pinion gears $P_1$ is splined to the radially outer circumference of the gear shaft 11a; and the ring gear $R_1$ is coupled to the sun gear $S_2$ of the second planetary gear unit G2 via a ring gear flange 30 with allownace for "floating." The sun gear $S_2$ of the second planetary gear unit G2 is supported in one thrust direction at one end thereof by contact with an end face of the carrier $C_1$ through a roller bearing and in the opposite thrust direction at the other end thereof by contact with an end face of the carrier $C_2$ through a roller bearing. The carrier $C_2$ is supported by the casing 10 through a radial ball bearing 19 and is splined to the drive shaft 12. The ring gear $R_2$ is splined to a flange 31 bolted to the casing 10 and is thereby held against rotation. Numeral 13 represents an oil pan for collecting oil circulated through the drivetrain; numeral 14 represents lubricating oil passages; numeral 24 represents a power cable for feeding three-phase alternating current electric power to the motor 2; and numeral 25 represents the winding of the stator 21.

With the transmission mechanism 3 as described above, where: the output torque of the motor 2 is T; the gear ratio $\lambda_1$ of the first planetary gear unit G1 is $Z_{S1}/Z_{R1}$ (wherein $Z_{S1}$ is the number of teeth of the sun gear $S_1$ and $Z_{R1}$ is the number of teeth of the ring gear $R_1$); and the gear ratio $\lambda_2$ of the second planetary gear unit G2 is $Z_{S2}/Z_{R2}$ (wherein $Z_{S2}$ is the number of teeth of the sun gear $S_2$ and $Z_{R2}$ is the number of teeth of the ring gear $R_2$), the output torque $T_{R1}$ of the ring gear $R_1$ of the first planetary gear G1 is expressed as:

$$T_{R1} = -(1/\lambda_1) \cdot T$$

and is a negative torque, or a torque in the reverse direction with respect to the input rotation. The torque, divided between the drive shafts 11, 12, for drive shaft 11 is expressed by:

$$T_L = (1 + (1/\lambda_1)) \cdot T$$

and the torque of other drive shaft 12 is expressed:

$$T_R = ((1/\lambda_2) - 1) \cdot (1/\lambda_1) \cdot T$$

The torques of both drive shafts 11 and 12 are in the positive direction, i.e., the same direction as the input rotation. To equalize the torque shares to the respective drive shafts 11, 12 the expression:

$$\lambda_2 = 1/(\lambda_1 + 2)$$

must be satisfied, which expression defines the relationship between the gear ratios $\lambda_1$ and $\lambda_2$ of the first and second planetary gear units G1, G2, respectively.

The speed reduction ratio in the transmission mechanism 3 may be defined as:

$$(T_L + T_R)/T = [(1+(1/\lambda_1)) \cdot T + ((1/\lambda_2) - 1) \cdot (1/\lambda_1) \cdot T]/T = 1 + (1/(\lambda_1 \cdot \lambda_2))$$

This can be rewritten for the case of $\lambda_1 = \lambda_2$ as:

$$(T_L + T_R)/T = 2(1 + (1/\lambda_1))$$

Figure 8:
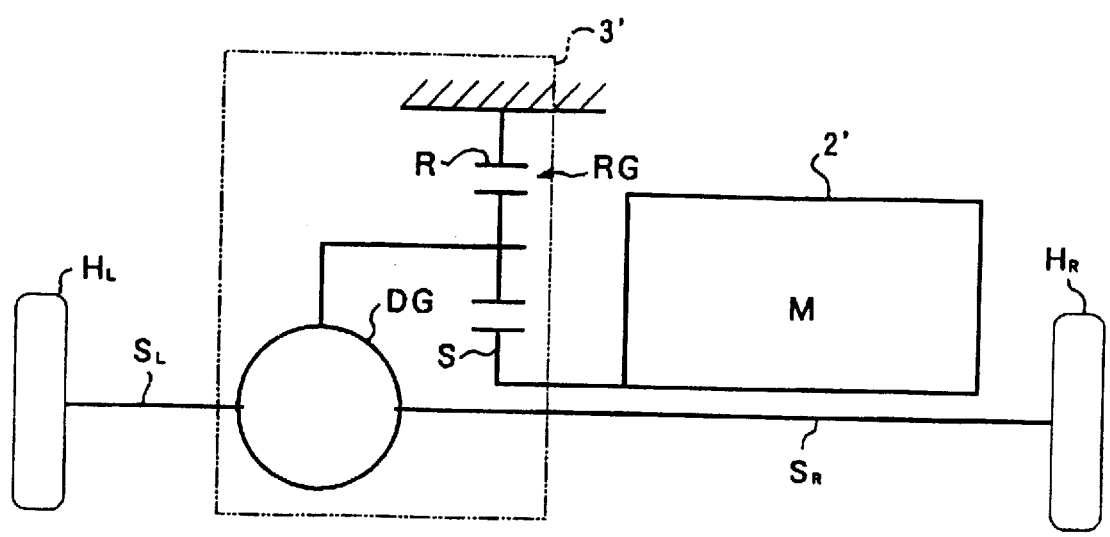
FIG. 8 is a skeletal diagram of a conventional drivetrain for an electric vehicles.
Figure 9:
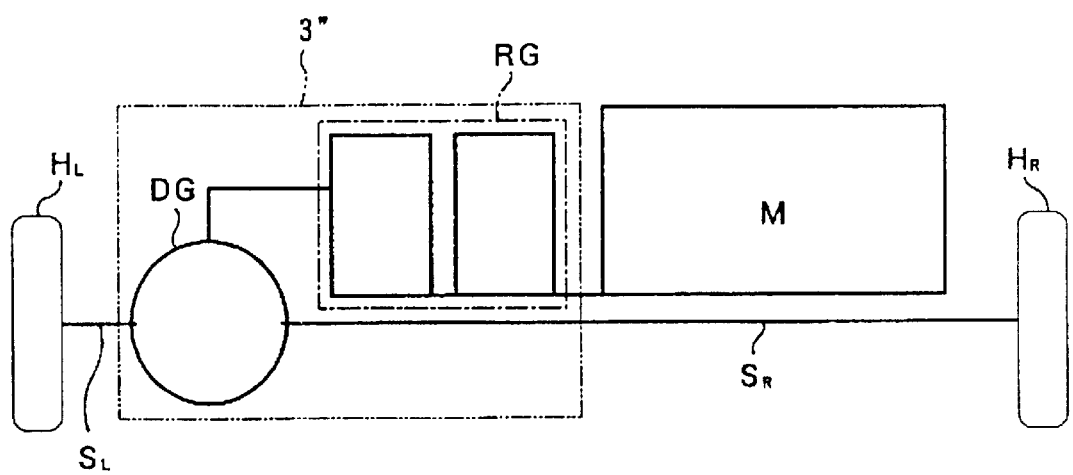
FIG. 9 is a skeletal diagram of another conventional drivetrain for an electric vehicle.

In contrast, the speed reduction ratio of the single planetary gear set described in Publication No. 1 shown here in FIG. 8, where, similarly: the output torque of the motor 2' is T'; the gear ratio of the speed reduction gearing RG is $\lambda$'; and the torques to drive shafts $S_L$, $S_R$ are $T'_L$, $T'_R$, respectively, is expressed as:

$$\begin{aligned}(T'_L + T'_R)/T' &= (1 + (1/\lambda'))T'/T' \\ &= 1 + (1/\lambda')\end{aligned}$$

Accordingly, $$2(1+(1/\lambda_1)) >> 1+(1/\lambda')$$

is obtained. It is therefore apparent that the transmission mechanism 3 of the present invention can achieve a speed reduction ratio significantly larger than that of Publication No. 1 even where the value of $\lambda_1$ is set to substantially the same value as the value of $\lambda'$.

Regarding the differential function, since the planetary gear units G1, G2 couple the motor 2 to both drive shafts 11, 12, these drive shafts are as a matter of course able to rotate relative to one another at different speeds according to the load difference between the left and right drive wheels $H_L$, $H_R$, so that no other differential device is required.

Thus, the transmission mechanism 3 of this embodiment can be made compact because the transmission mechanism composed of the two planetary gear units G1, G2, which are substantially equivalent, provides the necessary differential function and because the simple coupling between the two planetary gear units G1, G2 provides a large speed reduction ratio, so that the electric vehicle drivetrain can be made compact, while the motor may be both compact and lightweight.

There are 144 possible combinations for coupling the single pinion gear set and the double pinion gear set, a pair of the single pinion gear sets, or a pair of the double pinion gear sets, including the above-described combination. However, some of these possible combinations may not be suitable for achieving the objects of the present invention. Hence, several effective combinations of transmission mechanism elements will now be described as preferred embodiments.

FIG. 3 is a table of a first group of embodiments in which the single pinion gear set and the double pinion gear set are combined. Although only gear train (a) is shown with its respective gear elements labelled, the other gear trains (as well as those in FIGS. 4–7) use the same elements. In the columns headed "rotational speed" and "torque", a reference character in a circle represents an input element and a reference character in a square represents an output element. In the last two columns $\lambda_1$ represents the gear ratio between the sun gear $S_1$ and the ring gear $R_1$ of the first planetary gear unit G1, or $(Z_{S1}/Z_{R1})$. $\lambda_2$ represents the gear ratio between the sun gear $S_2$ and the ring gear $R_2$ of the second planetary gear unit G2, or $(Z_{S2}/Z_{R2})$.

Gear train (a) in the table is the same gear train as in the first embodiment described above and, therefore, its description is omitted here. Gear train (b) represents a second embodiment in which: the sun gear $S_1$ of the first planetary gear unit G1 is the first gear element connected to the motor 2; the carrier $C_1$ is the second gear element coupled to one drive shaft 11; the ring gear $R_1$ serves as the third gear element and is coupled to the fourth gear element, which here is the carrier $C_2$ of the second planetary gear unit; the ring gear $R_2$ is the fixed fifth gear element; and the sun gear $S_2$ is the sixth gear element and is connected to the other drive shaft 12. Gear train (c) represents a third embodiment in which: the ring gear $R_1$ is the second gear element coupled to one drive shaft 11; the carrier $C_1$ is the third gear element and is coupled to the sun gear $S_2$ as the fourth gear element; the ring gear $R_2$ is the fixed fifth gear element; and the carrier $C_2$ is the sixth gear element and is connected to the other drive shaft 12. To the extent that the sun gear $S_1$ is the first gear element coupled to the motor 2, the third embodiment is similar to the first and second embodiments. Gear train (d) represents a fourth embodiment different from the third embodiment to the extent that the carrier $C_1$ serving as the third gear element is coupled to the carrier $C_2$ serving as the fourth element and that the sun gear $S_2$ serving as the sixth element is coupled to the other drive shaft 12. The fourth embodiment is similar to the third embodiment to the extent that the gun gear $S_1$ and the ring gear $R_1$ are coupled to the motor and one drive shaft, respectively, and that the ring gear $R_2$ is fixed.

The table in FIG. 3 sequentially shows, for the gear trains (a) to (d), the rotational speed and the torque of each element, the torque share equalizing condition, and the speed reduction ratio, which derive from the respective coupling arrangements.

FIG. 4 shows embodiments of a second group in which the double pinion gear and the single pinion gear set are combined in a manner reverse to that of the first group of embodiments. Gear train (e) represents a fifth embodiment in which: the sun gear $S_1$ of the first planetary gear unit G1 serving as the first gear element is connected to the motor; the carrier $C_1$ serving as the second gear element is coupled to one drive shaft 11; the ring gear $R_1$ serving as the third gear element is coupled to the ring gear $R_2$ serving as the fourth gear element; the carrier $C_2$ serving as the fifth gear element is fixed; and the sun gear $S_2$ serving as the sixth gear element is connected to the other drive shaft 12. Similarly, gear train (f) is a sixth embodiment in which: the sun gear $S_1$ is coupled to the motor; the ring gear $R_1$ is coupled to one drive shaft; the carrier $C_1$ is coupled to the sun gear $S_2$; the ring gear R2 is coupled to the drive shaft 12; and the carrier $C_2$ is fixed. Gear train (g) is a seventh embodiment in which: the carrier $C_1$ is coupled to the motor; the sun gear $S_1$ is coupled to one drive shaft 11; the ring gear $R_1$ is coupled to the ring gear $R_2$; the sun gear $S_2$ is coupled to the drive shaft 12; and the carrier $C_2$ is fixed. Gear train (h) is an eighth embodiment in which: the carrier $C_1$ is coupled to the motor; the ring gear $R_1$ is coupled to one drive shaft 11; the sun gear $S_1$ is coupled to the sun gear $S_2$; the ring gear $R_2$ is coupled to the drive shaft 12; and the carrier $C_2$ is fixed. The table of FIG. 4 shows, in sequence for the gear trains (e) to (h), the rotational speed and the torque of each element, the torque share equalizing condition, and the speed reduction ratio, which derive from the respective coupling arrangements.

FIGS. 5 and 6 show embodiments of a third group in which a pair of the double pinion gear sets are combined. Because the gear trains in FIGS. 5 and 6 are shown in substantially the same manner as first and second groups, the description of the coupling arrangements will be abbreviated to avoid redundancy. Gear train (i) is a ninth embodiment in which: the sun gear $S_1$ is an input element; the carrier $C_1$ is one output element; the ring gear $R_1$ is coupled to the sun gear $S_2$; the ring gear R2 is fixed; and the carrier $C_2$ is the other output element. Gear train (j) represents a tenth embodiment in which: the sun gear $S_1$ is an input element; the carrier $C_1$ is one output element; the ring gear $R_1$ is coupled to the carrier $C_2$; the ring gear $R_2$ is fixed; and the sun gear $S_2$ is the other output element. Gear train (k) represents a eleventh embodiment in which: the sun gear $S_1$ is an input element; the ring gear $R_1$ is one output element; the carrier $C_1$ is coupled to the sun gear $S_2$; the ring gear $R_2$ is fixed; and the carrier $C_2$ is the other output element. Gear train (1) is a twelfth embodiment in which: the sun gear $S_1$ is an input element; the ring gear $R_1$ is one output element; the carrier $C_1$ is coupled to the carrier $C_2$; the ring gear $R_2$ is fixed; and the sun gear $S_2$ is the other output element. Gear train (m) represents a thirteenth embodiment in which: the carrier $C_1$ is an input element; the sun gear $S_1$ is one output element; the ring gear $R_1$ is coupled to the sun gear $S_2$; the ring gear $R_2$ is fixed; and the carrier $C_2$ is the other output element. Gear train (n) represents a fourteenth embodiment in which: the carrier $C_1$ is an input element; the sun gear $S_1$ is one output element; the ring gear $R_1$ is coupled to the carrier $C_2$; the ring gear $R_2$ is fixed; and the sun gear $S_2$ is the other output element. Gear train (o) represents a fifteenth embodiment in which: the carrier $C_1$ is an input element; the ring gear $R_1$ is one output element; the sun gear $S_1$ is coupled to the sun gear $S_2$; the ring gear $R_2$ is fixed; and the carrier $C_2$ is the other output element. Gear train (p) is a sixteenth embodiment in which: the carrier $C_1$ is an input element; the ring gear $R_1$ is one output element; the sun gear $S_1$ is coupled to the carrier $C_2$; the ring gear $R_2$ is fixed; and the sun gear $S_2$ is the other output element.

Finally, FIG. 7 is a table showing embodiments of a fourth group in which a pair of the single pinion gear sets is combined. Gear train (q) is a seventeenth embodiment in which: the sun gear $S_1$ is an input element; the carrier $C_1$ is one output; the ring gear $R_1$ is coupled to the sun gear $S_2$; the ring gear $R_2$ is fixed; and the carrier $C_2$ is the other output element. Gear train (r) is an eighteenth embodiment in which: the sun gear $S_1$ is an input element; the ring gear $R_1$ is one output element; the carrier $C_1$ is coupled to the ring gear $R_2$; the carrier $C_2$ is fixed; and the sun gear $S_2$ is the other output element. The first planetary gear unit G1 in the transmission mechanism 3 of the eighteenth embodiment is designed so that the absolute value of the torque transmitted to the third gear element, or the carrier $C_1$, is larger than the absolute value of the torque transmitted to the ring gear $R_1$ serving as the second gear element, and the second planetary gear unit G2 constitutes a speed increasing unit wherein: the ring gear $R_2$ is for input; the carrier $C_2$ is fixed; and the sun gear $S_2$ is for output.

Although the various embodiments have been described above mainly from the viewpoint of gear trains, the invention can be modified with various changes in detail within the scope of the claims which follow. It should also be noted that, although the respective embodiments have been described as distributing equal torque shares to drive shafts 11 and 12, a little inequality between these shares of torque can be allowed in practice and, in the practical sense, the torque shares can be deliberately set to be slightly different because the torque transmission efficiency to the one drive shaft 11 is a little better than the torque transmission efficiency to the other drive shaft 12 because the former has a fewer number of meshing engagement points than the latter.

The foregoing description of preferred embodiments of the invention has been presented for purposes of illustration and description, and is not intended to be exhaustive or to limit the invention to the precise forms disclosed. The description was selected to best explain the principles of the invention and their practical application and to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A drivetrain for an electric vehicle comprising:
    a motor;
    a pair of drive shafts, coupled to left and right drive wheels of the vehicle, respectively, one of which passes through the motor; and
    a transmission mechanism arranged coaxially with the pair of drive shafts for reducing rotational speed of the motor and for transmitting rotation at reduced speed to the pair of drive shafts, said transmission mechanism comprising:
        a first planetary gear unit having a first gear element coupled to the motor, a second gear element coupled to one of the drive shafts, and a third gear element, said first planetary gear unit increasing torque transmitted to the first gear element and then transmitting increased torque to the second gear element and transmitting torque in reverse direction between the second and third gear elements; and
        a second planetary gear unit having a fourth gear element coupled to the third gear element of the first planetary gear unit, a fixed fifth gear element, and a sixth gear element coupled to the other of the drive shafts, said second planetary gear unit transmitting the torque to the sixth gear element by reversing direction of torque received by the fourth gear element.

2. The drivetrain according to claim 1, wherein, within the first planetary gear unit, an absolute value of the torque transmitted to the third gear element is larger than the absolute value of the torque transmitted to the second gear element and wherein the second planetary gear unit functions as a speed increasing unit.

3. The drivetrain according to claim 1, wherein, within the first planetary gear unit, an absolute value of the torque transmitted to the third gear element is smaller than the absolute value of the torque transmitted to the second gear element and wherein the second planetary gear unit functions as a speed reduction unit.

* * * * *